United States Patent
Onishi et al.

(10) Patent No.: US 8,162,490 B2
(45) Date of Patent: Apr. 24, 2012

(54) PROJECTION TYPE VIDEO DISPLAY APPARATUS

(75) Inventors: Yasuo Onishi, Soraku-gun (JP); Hideki Yamamoto, Kyoto (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1084 days.

(21) Appl. No.: 11/472,297

(22) Filed: Jun. 22, 2006

(65) Prior Publication Data

US 2006/0290825 A1 Dec. 28, 2006

(30) Foreign Application Priority Data

Jun. 23, 2005 (JP) ................................. 2005-182791
Mar. 14, 2006 (JP) ................................. 2006-069046

(51) Int. Cl.
 *G03B 21/00* (2006.01)
(52) U.S. Cl. ............................ 353/122; 353/85; 353/121
(58) Field of Classification Search .................... 353/30, 353/69, 70, 85, 121, 122; 348/745, 746, 348/747

See application file for complete search history.

(56) References Cited

U.S. PATENT DOCUMENTS

| | | | | |
|---|---|---|---|---|
| 5,567,030 A * | 10/1996 | Shin ................................. | 353/85 |
| 6,476,560 B2 * | 11/2002 | Terami et al. ................... | 315/117 |
| 6,710,762 B1 | 3/2004 | Hasegawa | |
| 6,932,481 B2 * | 8/2005 | Koyama et al. ................. | 353/94 |
| 7,070,283 B2 * | 7/2006 | Akutsu ............................ | 353/69 |
| 7,086,739 B2 * | 8/2006 | Kida et al. ....................... | 353/52 |
| 7,364,309 B2 * | 4/2008 | Sugawara et al. ............... | 353/85 |
| 7,434,939 B2 * | 10/2008 | Tajiri .............................. | 353/85 |
| 2003/0223049 A1 | 12/2003 | Ohara | |
| 2004/0120149 A1 * | 6/2004 | Hu ................................. | 362/276 |
| 2005/0052622 A1 | 3/2005 | Morishita | |
| 2005/0068505 A1 | 3/2005 | Momose et al. | |
| 2005/0094110 A1 * | 5/2005 | Nakamura ....................... | 353/85 |
| 2005/0094112 A1 * | 5/2005 | Eguchi ............................ | 353/111 |
| 2005/0151937 A1 * | 7/2005 | Sugitani .......................... | 353/85 |
| 2005/0195372 A1 | 9/2005 | Ohara | |
| 2006/0192927 A1 * | 8/2006 | Ikeuchi et al. .................. | 353/119 |
| 2007/0002287 A1 * | 1/2007 | Matsumoto et al. ............. | 353/85 |

FOREIGN PATENT DOCUMENTS

CN 1497334 A 5/2004

(Continued)

OTHER PUBLICATIONS

Chinese Office Action dated Oct. 19, 2007, issued in corresponding Chinese Patent Application No. 200610095933.9.

*Primary Examiner* — Francis M Legasse, Jr.
*Assistant Examiner* — Bao-Luan Le
(74) *Attorney, Agent, or Firm* — Westerman, Hattori, Daniels & Adrian, LLP

(57) ABSTRACT

A projection type video display apparatus includes a projection lamp and a video signal processing circuit which performs video processing to an input video signal. The projection type video display apparatus includes means for performing an initializing process of the video signal processing circuit in a period until brightness of the projection lamp reaches brightness enough to project video since the projection lamp is lit and in a period except for a period during which lamp lighting noise is generated immediately after the projection lamp is lit.

5 Claims, 4 Drawing Sheets

FOREIGN PATENT DOCUMENTS

| | | |
|---|---|---|
| JP | 63-212991 A | 9/1988 |
| JP | 04-067691 U | 6/1992 |
| JP | 07-140434 A | 6/1995 |
| JP | 2000-147661 A | 5/2000 |
| JP | 2003-207843 A | 7/2003 |
| JP | 2004-004284 A | 1/2004 |
| JP | 2005-85629 A | 3/2005 |
| JP | 2005-128402 A | 5/2005 |
| JP | 2006-317485 A | 11/2006 |

* cited by examiner

PROJECTION TYPE VIDEO DISPLAY APPARATUS

BACKGROUND OF THE INVENTION

1. Field of the Invention

The present invention relates to a projection type video display apparatus such as a liquid crystal projector and a DLP projector.

2. Description of the Related Art

In the projection type video display apparatus in which a lamp is used as a light source like the liquid crystal projector, there is a problem that a time until lamp brightness reaches brightness enough to project video since the lamp is lit is too long. In order to avoid an influence of noise generated at lighting the lamp, generally the lamp is lit after completion of initialization of a video adjustment circuit and a panel adjustment circuit. Therefore, the time until the lamp brightness reaches the brightness enough to project the video from the power-on becomes longer.

Conventionally, for a period from the power-on until the lamp brightness reaches the brightness enough to project the video, the video is masked, a startup logo is displayed instead of video projection, or a countdown display is projected such that a user does not feel tired. However, the time from the power-on until the video is displayed cannot be shortened by such methods.

SUMMARY OF THE INVENTION

In view of the foregoing, an object of the invention is to provide a projection type video display apparatus which can achieve shortening time from power-on until lamp brightness reaches adequate brightness.

A first aspect of a projection type video display apparatus according to the invention includes a projection lamp and a video signal processing circuit which performs video processing to an input video signal, wherein the projection type video display apparatus includes means for performing an initializing process of the video signal processing circuit in a period until brightness of the projection lamp reaches brightness enough to project video since the projection lamp is lit and in a period except for a period during which lamp lighting noise is generated immediately after the projection lamp is lit.

In the first aspect of the projection type video display apparatus of the invention, for example, lighting of the projection lamp is detected based on voltage between electrodes of the projection lamp.

In the first aspect of the projection type video display apparatus of the invention, it is preferable to provide means for projecting black video until the initializing process of the video signal processing circuit is completed since the projection lamp is lit.

In the first aspect of the projection type video display apparatus of the invention, for example, the video signal processing circuit includes a video signal adjustment circuit and a panel adjustment circuit, the video signal adjustment circuit adjusting an input video signal to optimum video, the panel adjustment circuit adjusting the video signal obtained by the video signal adjustment circuit to video suitable for a display panel.

A second aspect of a projection type video display apparatus according to the invention includes a projection lamp and a video signal processing circuit which performs video processing to an input video signal, wherein the projection type video display apparatus includes a circuit which performs an initializing process of the video signal processing circuit in a period until brightness of the projection lamp reaches brightness enough to project video since the projection lamp is lit and in a period except for a period during which the lamp lighting noise is generated immediately after the projection lamp is lit.

In the second aspect of the projection type video display apparatus of the invention, for example, lighting of the projection lamp is detected based on voltage between electrodes of the projection lamp.

In the second aspect of the projection type video display apparatus of the invention, it is preferable to provide a circuit which projects black video until the initializing process of the video signal processing circuit is completed since the projection lamp is lit.

In the second aspect of the projection type video display apparatus of the invention, for example, the video signal processing circuit includes a video signal adjustment circuit and a panel adjustment circuit, the video signal adjustment circuit adjusting an input video signal to optimum video, the panel adjustment circuit adjusting the video signal obtained by the video signal adjustment circuit to video suitable for a display panel.

DETAILED DESCRIPTION OF THE PREFERRED EMBODIMENTS

An embodiment in which the invention is applied to a liquid crystal projector will be described below with reference to the drawings.

[1]Configuration of Liquid Crystal Projector.

Figure 1:
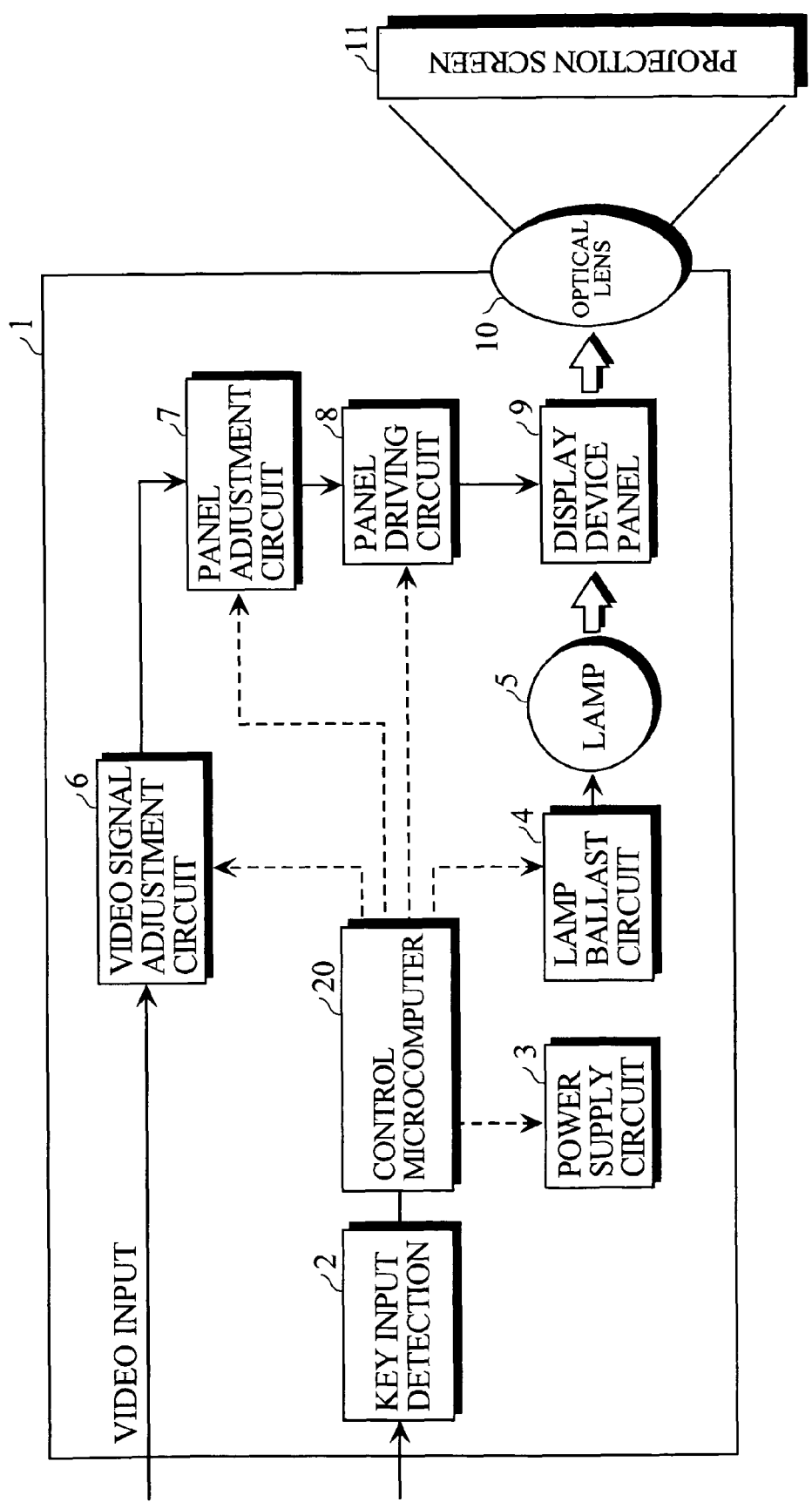
FIG. 1 is a block diagram showing a configuration of a liquid crystal projector.

FIG. 1 shows a configuration of a liquid crystal projector.

A liquid crystal projector 1 includes a key input detection circuit 2, a power supply circuit 3, a lamp (projection lamp) 5, a lamp ballast circuit 4, a display device panel 9, a video signal adjustment circuit 6, a panel adjustment circuit 7, a panel driving circuit 8, an optical lens 10 and a control microcomputer 20, the key input detection circuit 2 detecting key input, the power supply circuit 3 supplying electric power to each circuit, the lamp 5 being a light source, the lamp ballast circuit 4 driving and controlling the lamp 5, the video signal adjustment circuit 6 adjusting the input video signal to optimum video, the panel adjustment circuit 7 adjusting the video signal obtained by the video signal adjustment circuit 6 to video suitable for the display device panel 9, the panel driving circuit 8 writing the video signal obtained by the panel adjustment circuit 7 in the display device panel 9, and the control microcomputer 20 controlling each circuit. The light from the lamp 5 passes through the display device panel 9 and the optical lens 10, which projects the video written in the display device panel 9 onto a projection screen 11.

The video signal adjustment circuit 6 includes an A/D conversion circuit, a video demodulating circuit, an image quality adjustment circuit and the like. The panel adjustment circuit 7 includes a gamma correction circuit, a color shading correction circuit, an image quality adjustment circuit and the like. The video signal adjustment circuit 6 and the panel adjustment circuit 7 constitute the video signal processing circuit.

The control microcomputer 20 controls the startup of the power supply circuit 3 and turn-on and turn-off of the lamp 5. The control microcomputer 20 also controls the settings of the image signal adjustment circuit 6, the panel adjustment circuit 7, and the panel driving circuit 8.

Figure 2:
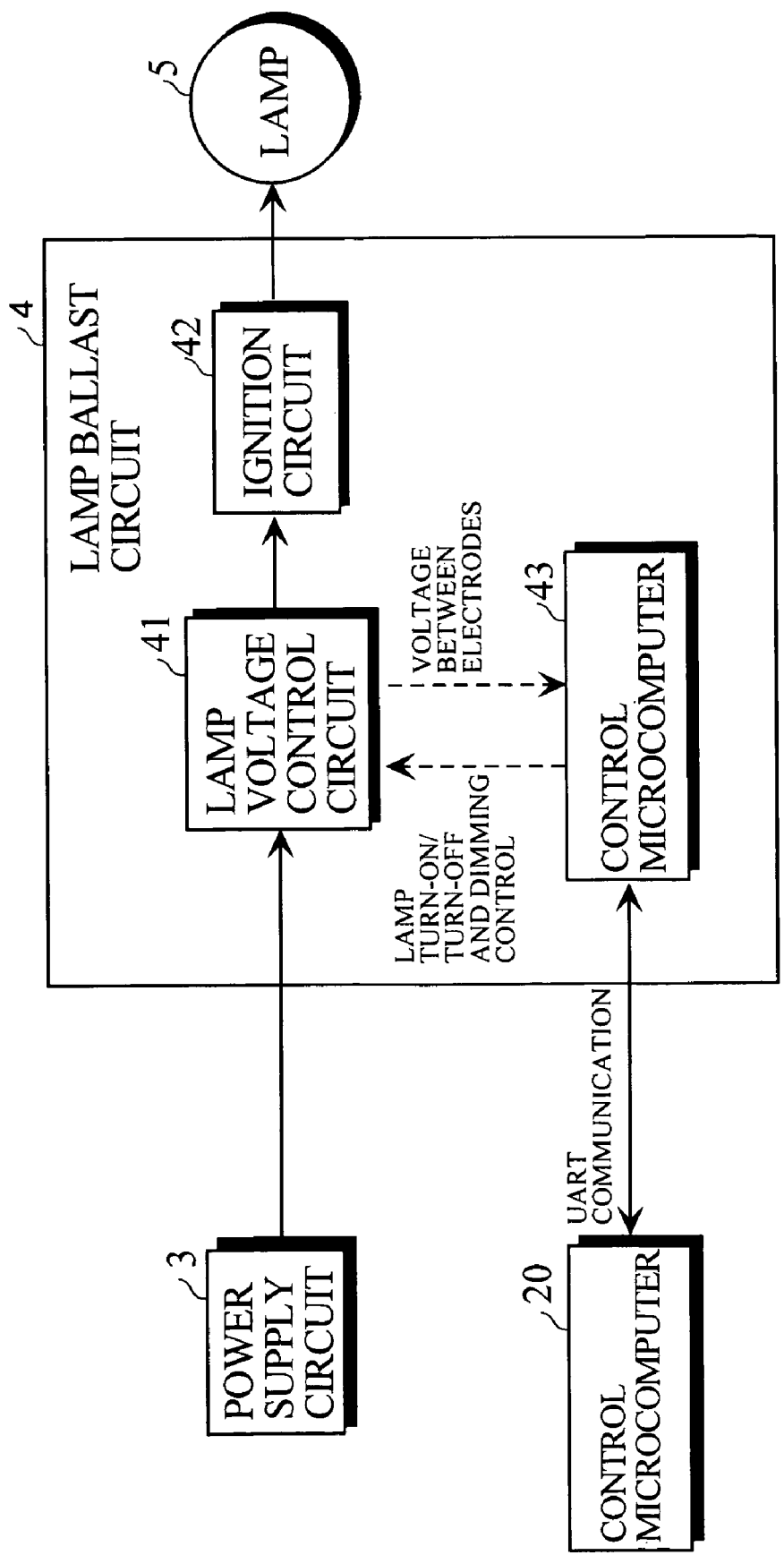
FIG. 2 is a block diagram showing a configuration of a lamp ballast circuit 4.

FIG. 2 shows a configuration of a lamp ballast circuit 4.

As is well known, the lamp ballast circuit 4 includes a lamp voltage control circuit 41, an ignition circuit (lighting circuit) 42, and a control microcomputer 43, the lamp voltage control circuit 41 controlling lamp voltage, and the ignition circuit 42 lighting the lamp.

The control microcomputer 43 is connected to the control microcomputer 20, which allows communication between the control microcomputers 43 and 20 by UART communication. The control microcomputer 43 controls turn-on, turn-off, and dimming of the lamp with respect to the lamp voltage control circuit 41. The voltage between the lamp electrodes (discharge voltage) is supplied to the control microcomputer 43 through the ignition circuit (lighting circuit) 42 and the lamp voltage control circuit 41.

[2] Procedure of Starting Lamp

Figure 3:
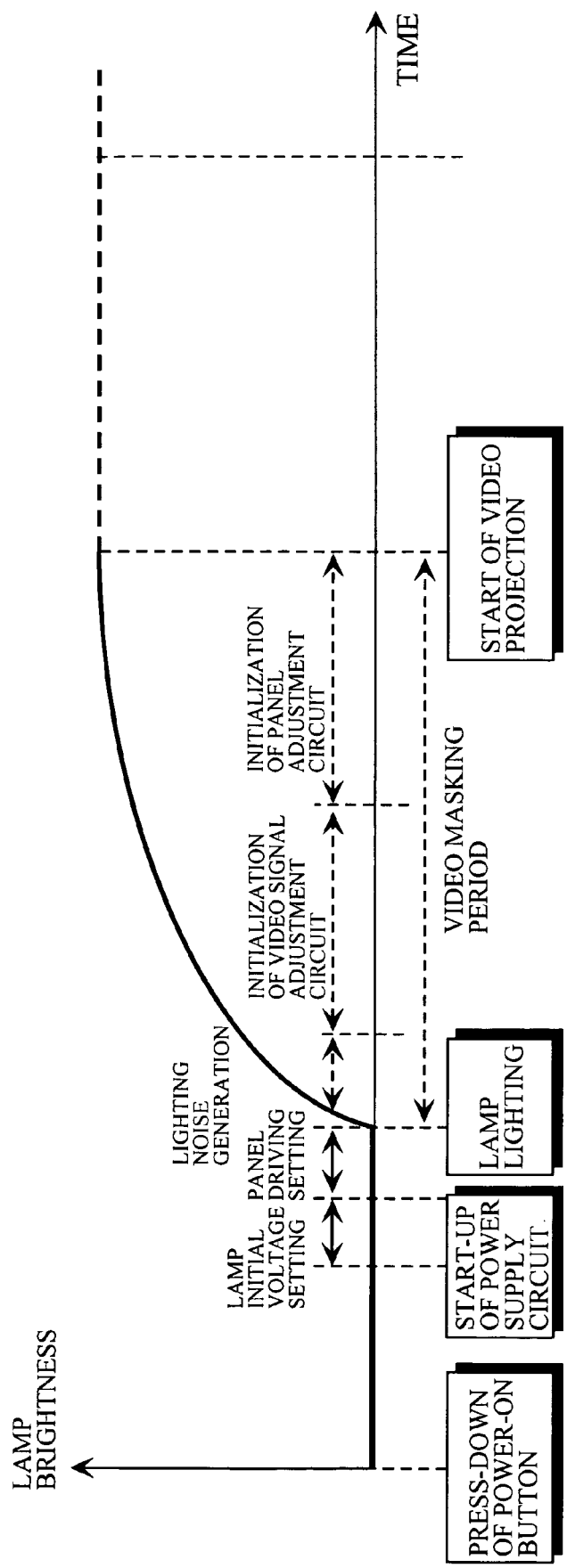
FIG. 3 is a timing chart showing a lamp starting procedure and a change in brightness of a lamp according to an embodiment.

FIG. 3 shows a lamp starting procedure and a change in brightness of the lamp according to the embodiment. In FIG. 3, a horizontal axis indicates time and a vertical axis indicates lamp brightness.

When a user presses down a power-on button, the key input detection circuit 2 detects the press-down of the power-on button, and the control microcomputer 20 starts the startup control of the liquid crystal projector. That is, the control microcomputer 20 firstly starts up the power supply circuit 3 to supply electric power to each circuit.

Then, the control microcomputer 20 performs the minimum setting for lighting the lamp. Specifically, while the control microcomputer 20 performs lamp initial voltage setting to the lamp ballast circuit 4, the control microcomputer 20 performs panel driving setting to the panel driving circuit 8. Then, the control microcomputer 20 performs control for lighting the lamp, which allows the lamp to be lit.

When the lighting of the lamp is detected, after a lapse of a predetermined time in order to avoid a period during which lighting noise is generated, the control microcomputer 20 initializes the video signal adjustment circuit 6. Specifically, the control microcomputer 20 initializes the A/D conversion circuit, the video demodulating circuit, and the image quality adjustment circuit in the video signal adjustment circuit 6. The control microcomputer 20 detects lighting of the lamp based on whether or not the voltage between the lamp electrodes, supplied from the control microcomputer 43 in the lamp ballast circuit 4 to the control microcomputer 20, becomes a predetermined value. Then, the control microcomputer 20 initializes the panel adjustment circuit 7. Specifically, the control microcomputer 20 initializes the gamma correction circuit, the color shading correction circuit, and the image quality adjustment circuit in the panel adjustment circuit 7. When lamp brightness reaches brightness enough to project video, video projection is started.

At a time of setting the panel driving to the panel driving circuit 8, black display setting is performed to project black video. The black display setting is released at the end of the procedure of initializing the panel adjustment circuit 7. As a result, video is masked until the initialization of the panel adjustment circuit 7 is completed since the lamp is lit. When the initialization of the panel adjustment circuit 7 is completed, normal video projection is started.

Because black display setting for projecting black video is performed at a time of setting the panel driving to the panel driving circuit 8, black video can securely be projected without being influenced by the pre-stage circuits (the video signal adjustment circuit 6 and the panel adjustment circuit 7).

Figure 4:
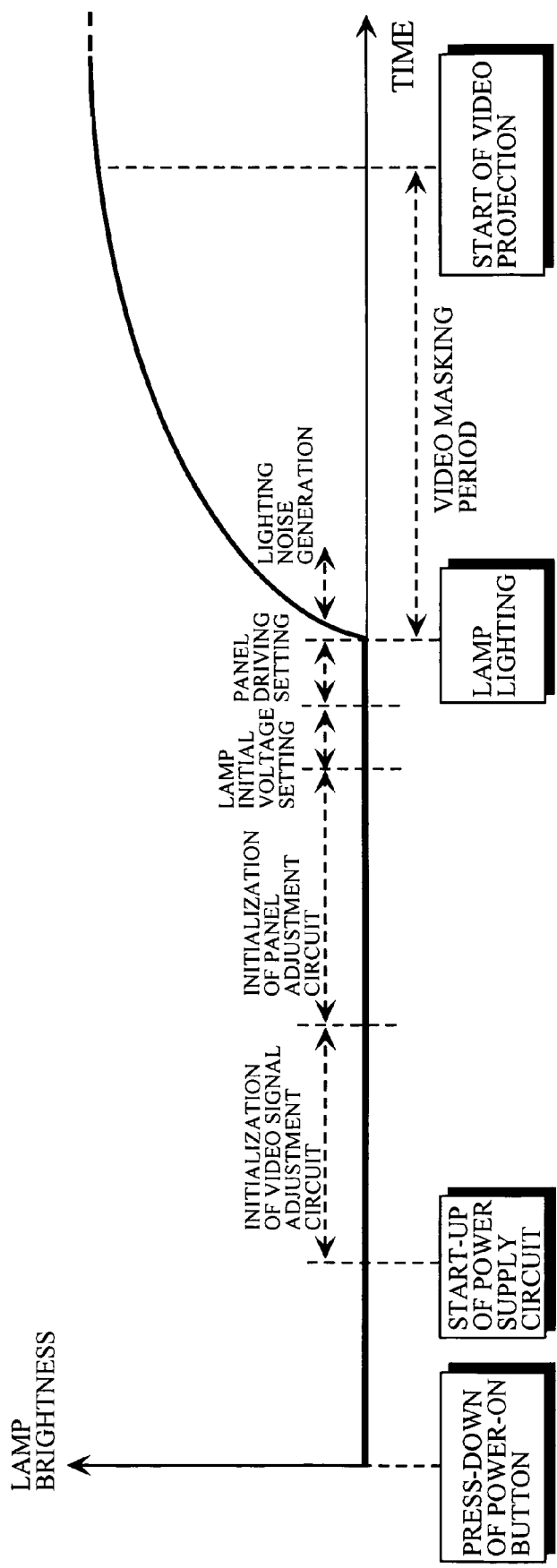
FIG. 4 is a timing chart showing a lamp starting procedure and a change in brightness of a lamp according to a conventional example.

FIG. 4 shows the lamp starting procedure and a change in brightness of the lamp according to a conventional example.

In the conventional example, when a user presses down a power-on button, the power supply circuit 3 is made to start up. In order to avoid lamp lighting noise, the panel adjustment circuit 7 is initialized and the video signal adjustment circuit 6 is initialized before the lamp is lit.

Then, the panel driving setting is performed to the panel driving circuit 8 while the lamp initial voltage setting is performed, and the control is performed for lighting the lamp, thereby the lamp is lit. When lamp brightness reaches brightness enough to project video after the lamp is lit, video projection is started. Video is masked until lamp brightness reaches brightness enough to project video since the lamp is lit.

When the embodiment is compared to the conventional example, time until the lamp is lit since the power supply circuit is started up is shortened in the embodiment. This is because that the video signal adjustment circuit 6 and the panel adjustment circuit 7 are not initialized before the lamp is lit according to the embodiment while the video signal adjustment circuit 6 and the panel adjustment circuit 7 are initialized before the lamp is lit according to the conventional example.

According to the embodiment, the video signal adjustment circuit 6 and the panel adjustment circuit 7 are initialized in a period until lamp brightness reaches brightness enough to project video since the lamp is lit, and in a period except for a period during which the lamp noise is generated immediately after the lamp is lit. That is, according to the embodiment, by effectively utilizing the period until lamp brightness reaches brightness enough to project video since the lamp is lit, the time until the lamp is lit since the power supply circuit is started up, i.e., the time until the lamp is lit since the power-on button is pressed down, is shortened. Therefore, time until lamp brightness reaches brightness enough to project video since the power-on button is pressed down (time from power-on until video is projected) is shortened.

What is claimed is:

1. A projection video display apparatus, comprising:

a projection lamp;

a video signal processing circuit which performs video processing to an input video signal; and a circuit which performs an initializing process of the video signal processing circuit, the initializing process being performed during a period beginning with lighting of the projection lamp and ending when a brightness of the projection lamp reaches brightness enough to project video, and excluding a period during which lamp lighting noise is generated immediately after the lighting of the projection lamp.

2. The projection video display apparatus according to claim 1, comprising a circuit which projects black video until the initializing process of the video signal processing circuit is completed since the projection lamp is lit.

3. The projection video display apparatus according to claim 1, wherein the video signal processing circuit includes a video signal adjustment circuit and a panel adjustment circuit, the video signal adjustment circuit adjusting an input video signal to optimum video, the panel adjustment circuit adjusting the video signal obtained by the video signal adjustment circuit to video suitable for a display panel.

4. The projection video display apparatus according to claim 1, further comprising:

a control microcomputer to detect lighting of the projection lamp, wherein lighting of the projection lamp is detected based on voltage between electrodes of the projection lamp.

5. A method of controlling a projection video display apparatus, comprising:

detecting lighting of a projection lamp; and performing an initializing process of a video signal processing circuit which performs video processing to an input video signal, the performing of the initializing process of the video signal processing circuit being performed during a period beginning with the lighting of the projection lamp and ending when a brightness of the projection lamp reaches brightness enough to project video, and excluding a period during which lamp lighting noise is generated immediately after the lighting of the projection lamp.

* * * * *